United States Patent
Hsu et al.

(10) Patent No.: US 12,221,998 B2
(45) Date of Patent: *Feb. 11, 2025

(54) HINGE

(71) Applicant: FOSITEK CORPORATION, New Taipei (TW)

(72) Inventors: An-Szu Hsu, New Taipei (TW); An-Wei Chung, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 198 days.

This patent is subject to a terminal disclaimer.

(21) Appl. No.: 18/152,353

(22) Filed: Jan. 10, 2023

(65) Prior Publication Data

US 2024/0175464 A1  May 30, 2024

(30) Foreign Application Priority Data

Nov. 28, 2022 (TW) .................................. 111145397

(51) Int. Cl.
*F16C 11/04* (2006.01)
*G06F 1/16* (2006.01)

(52) U.S. Cl.
CPC ............ *F16C 11/04* (2013.01); *G06F 1/1681* (2013.01)

(58) Field of Classification Search
CPC ..... F16C 11/04; H04M 1/022; H04M 1/0268; G06F 1/1681; G06F 1/1652
See application file for complete search history.

(56) References Cited

U.S. PATENT DOCUMENTS

| | | | | |
|---|---|---|---|---|
| 10,550,880 B2* | 2/2020 | Hsu | ....................... | E05D 11/082 |
| 11,334,122 B2* | 5/2022 | Hsu | ....................... | E05D 11/082 |
| 11,567,544 B2* | 1/2023 | Liu | ..................... | H04M 1/0216 |
| 11,681,335 B1* | 6/2023 | Hsu | ....................... | G06F 1/1681 |
| | | | | 361/679.01 |
| 11,846,997 B2* | 12/2023 | Liao | ....................... | G06F 1/1616 |
| 11,977,421 B2* | 5/2024 | Yang | ..................... | G06F 1/1681 |
| 12,010,254 B2* | 6/2024 | Liu | ......................... | H04M 1/022 |
| 12,031,570 B2* | 7/2024 | Hsu | ....................... | G06F 1/1681 |
| 12,079,047 B2* | 9/2024 | Hsu | ......................... | F16C 11/04 |
| 2023/0217616 A1* | 7/2023 | Park | ....................... | G06F 1/1679 |
| | | | | 361/807 |
| 2023/0309249 A1* | 9/2023 | Kinoshita | ............. | G06F 1/1652 |
| 2023/0409090 A1* | 12/2023 | Hong | ........................ | G09F 9/30 |

(Continued)

*Primary Examiner* — Jason W San
*Assistant Examiner* — Matthew J Sullivan
(74) *Attorney, Agent, or Firm* — Birch, Stewart, Kolasch & Birch, LLP

(57) ABSTRACT

A hinge is connectable with two housing shells for permitting relative opening and closing of the housing shells, and includes a fixed seat, at least two rotating units, two lateral support plates and a center support plate. The rotating units are disposed at two sides of a centerline of the fixed seat and are connectable with the housing shells. The rotating units are shiftable between an open state and a closed state. Each rotating unit includes a linking member arcuately slidable on the fixed seat. The lateral support plates are mounted on the linking members, and have central notches. The center support plate is movably disposed on the fixed seat and is moved with the rotating units. In the open state, the center support plate is disposed in the central notches. In the closed state, the center support plate abuts against the fixed seat.

9 Claims, 10 Drawing Sheets

(56) References Cited

U.S. PATENT DOCUMENTS

| | | | | |
|---|---|---|---|---|
| 2023/0421682 A1* | 12/2023 | Jung | ................ | F16C 11/04 |
| 2024/0040718 A1* | 2/2024 | Cao | ................ | F16C 11/04 |
| 2024/0044360 A1* | 2/2024 | Zhang | ................ | H04M 1/022 |
| 2024/0129390 A1* | 4/2024 | Gao | ................ | G06F 1/1652 |
| 2024/0175464 A1* | 5/2024 | Hsu | ................ | G06F 1/1681 |
| 2024/0218902 A1* | 7/2024 | Feng | ................ | F16C 11/04 |
| 2024/0219964 A1* | 7/2024 | Cha | ................ | G06F 1/1652 |
| 2024/0219978 A1* | 7/2024 | Nagai | ................ | H04M 1/02 |
| 2024/0241552 A1* | 7/2024 | Zhang | ................ | G06F 1/16 |
| 2024/0259487 A1* | 8/2024 | Sun | ................ | H04M 1/0268 |
| 2024/0263669 A1* | 8/2024 | Zhang | ................ | F16C 11/04 |
| 2024/0275873 A1* | 8/2024 | Zhou | ................ | H04M 1/0268 |
| 2024/0288902 A1* | 8/2024 | You | ................ | G06F 1/1681 |
| 2024/0302868 A1* | 9/2024 | Feng | ................ | G06F 1/1652 |
| 2024/0302871 A1* | 9/2024 | Zhang | ................ | H05K 5/0226 |

* cited by examiner

HINGE

CROSS-REFERENCE TO RELATED APPLICATION

This application claims priority to Taiwanese Invention Patent Application No. 111145397, filed on Nov. 28, 2022.

FIELD

The disclosure relates to a hinge, and more particularly to a hinge having two lateral support plates for supporting a flexible display of a flexible electronic device.

BACKGROUND

A conventional hinge is connectable with two housing shells for permitting relative folding and unfolding of the housing shells. The hinge includes a fixed seat, two rotating units and two lateral support plates. The two rotating units are disposed on the fixed seat and shiftable between an open state and a closed state. Each rotating unit includes a linking member slidably mounted on the fixed seat. The two lateral support plates are disposed on and moved with the linking members of the rotating units, respectively. In the open state, inboard side edges of the lateral support plates are juxtaposed and adjacent to each other. In the closed state, the lateral support plates face each other and the distance between the inboard side edges is larger than the distance between outboard side edges of the lateral support plates.

A flexible circuit board is disposed between the housing shells and is concealed by the two lateral support plates. However, in the closed state, the flexible circuit board is stretched and pulled due to the difference in distance between the inboard side edges and the outboard side edges, and might be broken.

SUMMARY

Therefore, an object of the disclosure is to provide a hinge that can alleviate at least one of the drawbacks of the prior art.

According to the disclosure, the hinge is connectable with two housing shells for permitting relative opening and closing of the housing shells, and includes a fixed seat, at least two rotating units, two lateral support plates and a center support plate. The fixed seat extends in a front-rear direction and has two elongated sides which extend in the front-rear direction and which are opposite to each other in a left-right direction, and at least two first guideways which are disposed at two sides of a centerline between the two elongated sides, respectively, and which are arcuate. The rotating units are disposed at the two sides of the centerline and are adjacent to the first guideways, respectively, and are connectable with the housing shells, respectively. The rotating units are shiftable between an open state and a closed state. Each of the rotating units includes a linking member. The linking member has a linking body and a first arcuate key which is disposed on the linking body to be fittingly slidable on a respective one of the first guideways. The linking body has a plate supporting surface which faces upwardly. The lateral support plates respectively have two inboard plate edges each extending in the front-rear direction, and two support walls extending in the left-right direction from a respective one of the inboard plate edges to terminate at two outboard plate edges, respectively. The support walls are respectively mounted on the plate supporting surfaces of the linking members of the rotating units to be moved with the linking members. Each of the lateral support plates has a central notch which is recessed from one of the inboard plate edges in the left-right direction. The center support plate is movably disposed on the fixed seat and is moved with the rotating units. In the open state, the inboard plate edges of the lateral support plates are juxtaposed and adjacent to each other, and the center support plate is in a filling position, where the center support plate is disposed in the central notches of the lateral support plates, to permit the lateral support plates and the center support plate to cooperatively conceal the fixed seat in an up-down direction. In the closed state, the lateral support plates face each other in the left-right direction, a distance between the inboard plate edges of the lateral support plates is larger than a distance between the outboard plate edges of the lateral support plates, and the center support plate is disposed in an abutting position, where the center support plate abuts against the fixed seat.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
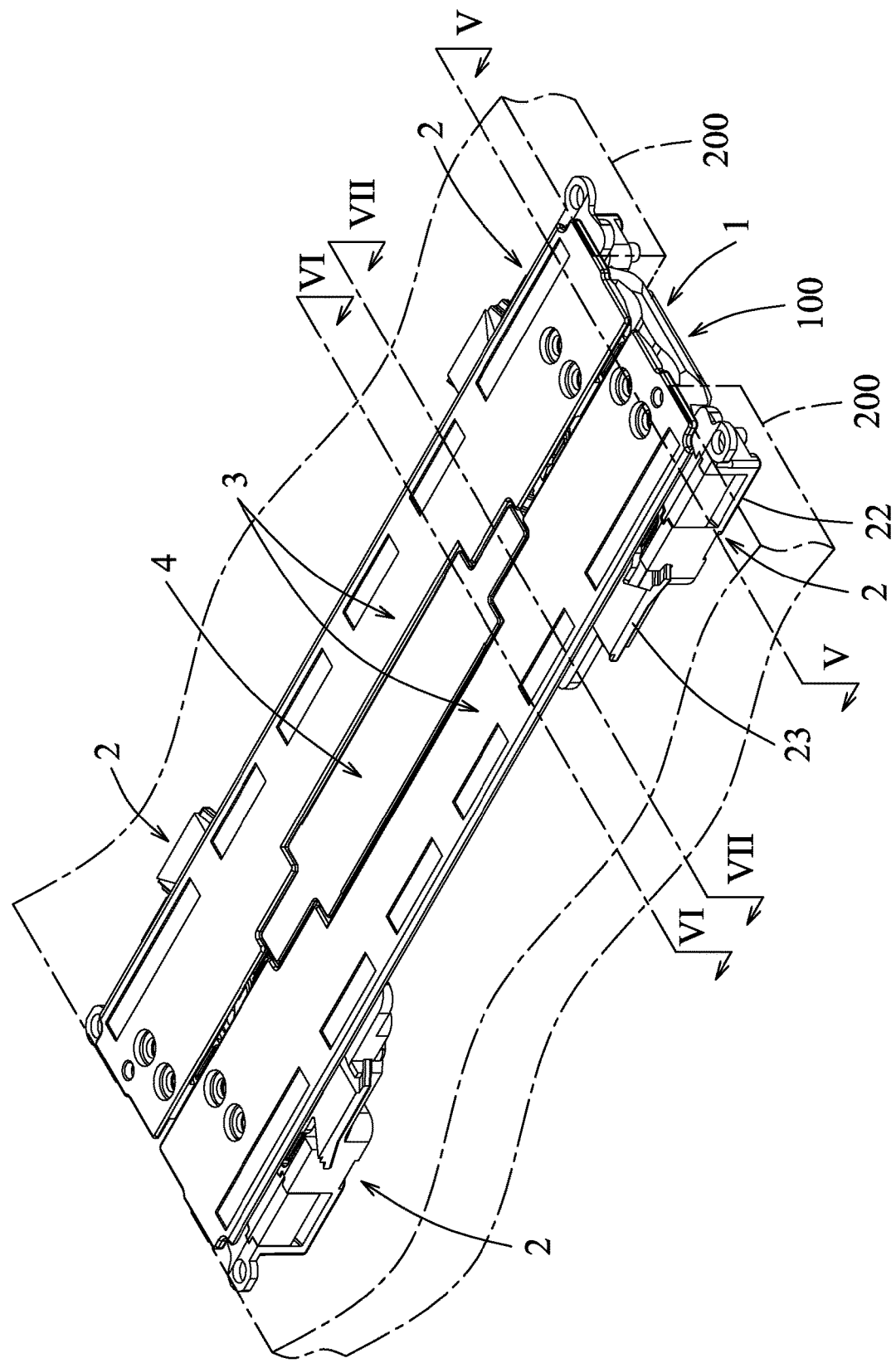
FIG. 1 is a perspective view illustrating an embodiment of a hinge according to the disclosure in an open state.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 5:
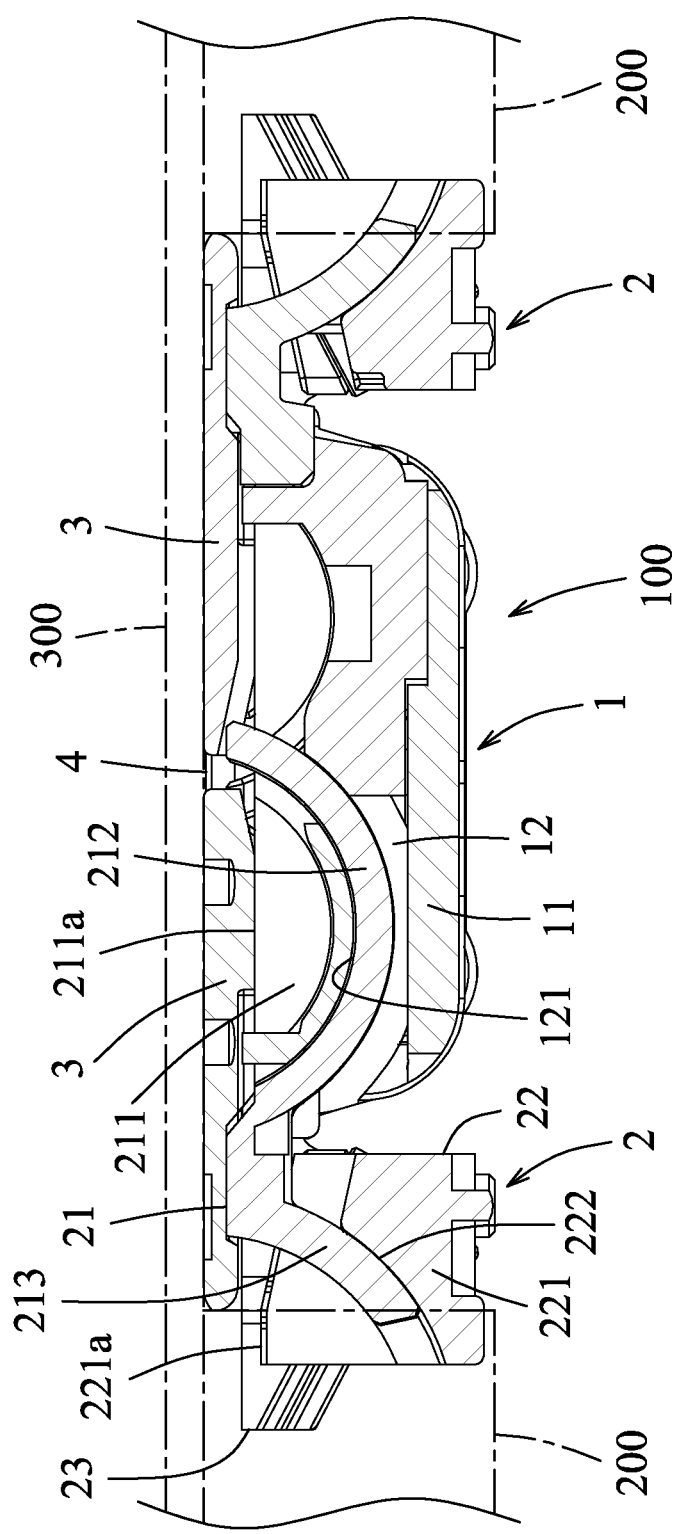
FIG. 5 is a sectional view taken along line V-V of FIG. 1.
Figure 6:
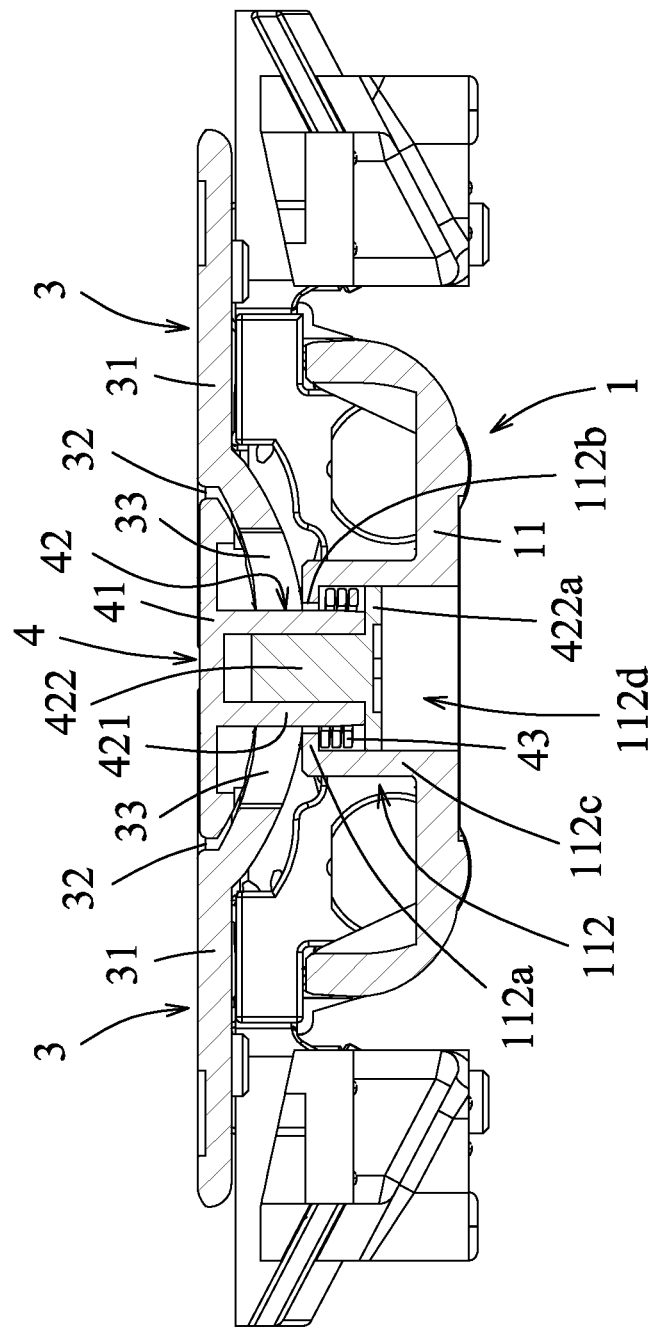
FIG. 6 is a sectional view taken along line VI-VI of FIG. 1.
Figure 7:
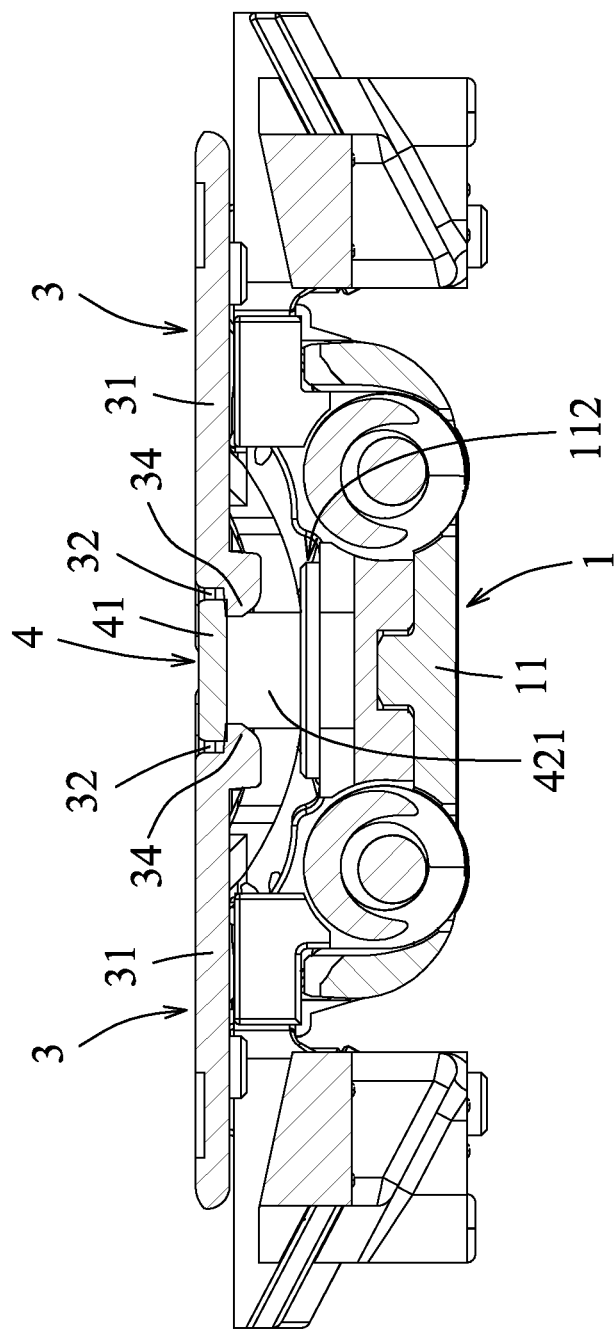
FIG. 7 is a sectional view taken along line VII-VII of FIG. 1.

Referring to FIGS. 1 to 4, an embodiment of a hinge 100 according to the disclosure is connectable with two housing shells 200 of a flexible electronic device (not shown) for permitting relative opening and closing of the housing shells 200, and for supporting a flexible display 300 (see FIG. 5). The hinge 100 includes a fixed seat 1, two pairs of rotating units 2, two lateral support plates 3, a center support plate 4 and two torque transmission and synchronous driving mechanisms 5.

The fixed seat 1 includes a fixed frame 11 which extends in a front-rear direction and which has two elongated sides 111 opposite to each other in a left-right direction, a seat housing (not shown) which is disposed under the fixed frame 11, and two rail frames 12 which are securely mounted on and located above the fixed frame 11 and which are opposite to each other in the front-rear direction. The fixed frame 11 defines a centerline (C) between the two elongated sides 111 and parallel to the elongated sides 112. The fixed frame 11 has two guiding sockets 112 opposite to each other along the centerline (C) and aligned with each other at the centerline (C). Each guiding socket 112 has a surrounding wall (112c) extending upwardly to terminate at an upper end wall (112a) which extends radially to define a narrow hole (112b). The upper end wall (112a) cooperates with the surrounding wall (112c) to define a receiving space (112d) in spatial communication with the narrow hole (112b). Each rail frame 12 is formed with two first guideways 121 which are disposed at two sides of the centerline (C), respectively, and which are arcuate.

Figure 8:
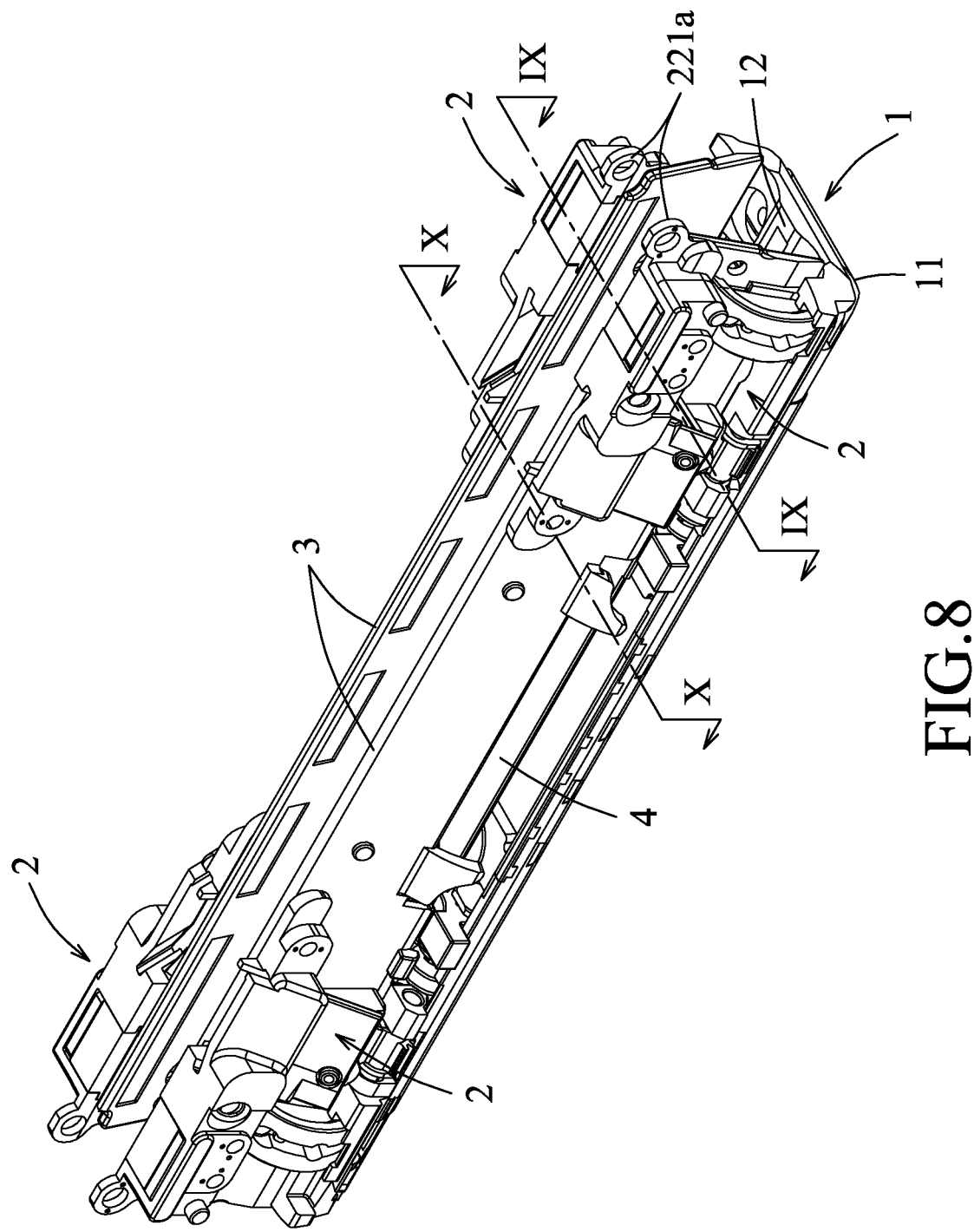
FIG. 8 is a perspective view of the embodiment in a closed state.

With reference to FIGS. 1, 2, 4 and 5, the rotating units 2 of each pair are disposed on the respective rail frame 12 at the two sides of the centerline (C), and are adjacent to the first guideways 121, respectively. The rotating units 2 of each pair are connectable with the housing shells 200, respectively. The rotating units 2 are shiftable between an open state (as shown in FIG. 1) and a closed state (as shown in FIG. 8). Each rotating unit 2 includes a linking member 21, a sliding member 22, a rotary bracket 23 and an auxiliary shaft member 24.

The linking member 21 has a linking body 211, a first arcuate key 212 which is disposed on the linking body 211 to be fittingly slidable on the corresponding first guideway 121, and a second arcuate key 213 which is disposed on the linking body 211 and which extends in the left-right direction away from the fixed seat 1. The linking body 211 has a plate supporting surface (211a) which faces upwardly.

The sliding member 22 has a sliding body 221, a second guideway 222 which is formed on the sliding body 221 and which is arcuate for the second arcuate key 213 to be fittingly slidable on the second guideway 222, and an inclined sliding portion 223 which is formed on the sliding body 221 opposite to the second guideway 222 in the front-rear direction. The sliding body 221 has a shell supporting surface (221a) on which a respective one of the housing shells 200 is disposed, and which faces upwardly. In the embodiment, the inclined sliding portion 223 is in the form of a recessed duct and is inclined relative to the shell supporting surface (221a).

With reference to FIGS. 2 to 5, the rotary bracket 23 is pivotably mounted on the fixed seat 1. The rotary bracket 23 has a bracket body 231, an inclined guiding portion 232 which is formed on the bracket body 231 and which is fittingly movable on the inclined sliding portion 223, and a rivet 233 which is disposed on the bracket body 231. The bracket body 231 has a pivot shaft (231a) which is disposed opposite to the inclined guiding portion 232 in the left-right direction and which is pivotably mounted on the corresponding rail frame 12 of the fixed seat 1, and a bracket toothed portion (231b) which is formed on the pivot shaft (231a). During shifting of the rotating units 2 from the open state to the closed state, the sliding member 22 is slided relative to the second arcuate key 213 and the inclined guiding portion 232, and is rotated relative to the fixed seat 1. In the embodiment, the inclined guiding portion 232 is in the form of a sliding block. The pivot shaft (231a) is pivotally disposed on the fixed seat 1 such that the rotary bracket 23 is rotated about a rotating center in the pivot shaft (231a).

The auxiliary shaft member 24 is inclined along the extending direction of the inclined sliding portion 223 and is pivotally disposed on the sliding member 22. The rivet 233 of the rotary bracket 23 is slidably engaged in a slot 241 of the auxiliary shaft member 24 to stabilize the sliding movement of the sliding member 22 relative to the inclined guiding portion 232.

The two lateral support plates 3 respectively have two inboard plate edges 311 each extending in the front-rear direction, and two support walls 31 extending in the left-right direction from a respective one of the inboard plate edges 311 to terminate at two outboard plate edges 312, respectively. The support walls 31 are respectively mounted on the plate supporting surfaces (211a) of the linking members 21 of the rotating units 2 to be moved with the linking members 21. Each of the lateral support plates 3 has a central notch 32 which is recessed from the respective inboard plate edge 311 in the left-right direction. Each of the lateral support plates 3 further has a plurality of raising projections 33 and a plurality of bracing projections 34 each projecting from the respective inboard plate edge 311 into the central notch 32.

With reference to FIGS. 1, 2, 3 and 6, the center support plate 4 is movably disposed on the fixed seat 1 and is moved with the rotating units 2. The center support plate 4 has a plate wall 41, two guided plugs 42 which extend downwardly from the plate wall 41 to be slidably engaged with the guiding sockets 112, respectively, and two spring members 43 which are sleeved around the guided plugs 42, respectively. Each guided plug 42 includes a plug 421 which extends downwardly from and is integrally formed with the plate wall 41 and which is configured to pass through the narrow hole (112b), and a fastener 422 which is connected with the plug 421 and threadedly engaged with the plug 421, and which is formed with a head portion (422a) at an end thereof away from the plate wall 41. Each spring member 43 is disposed between the head portion (422a) and the upper end wall (112a) of the respective guiding socket 112 so as to bias the head portion (422a) downwardly so as to urge the center support plate 4 to move downwardly relative to the fixed frame 11. Also, at least part of the guided plug 42 and the spring member 43 are received in the receiving space (112d) of the corresponding guiding socket 112. The head portion (422a) is slidably disposed within the surrounding wall (112c) and opposite to the upper end wall (112a). The spring member 43 is disposed between the head portion (422a) and the upper end wall (112a) so as to bias the head portion (422a) away from the upper end wall (112a).

With reference to FIGS. 2, 5, 6 and 7, in the open state, the inboard plate edges 311 of the lateral support plates 3 are juxtaposed and adjacent to each other, and the center support plate 4 is in a filling position, where the center support plate 4 is disposed in the central notches 32 of the lateral support plates 3, to permit the lateral support plates 3 and the center support plate 4 to cooperatively conceal the fixed seat 1 in an up-down direction. Also, in the open state, the shell supporting surfaces (221a) of the sliding members 22 are parallel to the plate supporting surfaces (211a) of the linking members 21. Thus, the two housing shells 200 which are disposed on the shell supporting surfaces (221a) of the sliding members 22, and the two lateral support plates 3 which are disposed on the plate supporting surfaces (211a) of the linking members 21 have upwardly facing surfaces with the same height to support the flexible display 300. Moreover, in the open state, the raising projections 33 and the bracing projections 34 of the lateral support plates 3 raise and support the center support plate 4 to keep the center support plate 4 at the same height position as that of the lateral support plates 3 so that the flexible display 300 is provided with further support.

Figure 9:
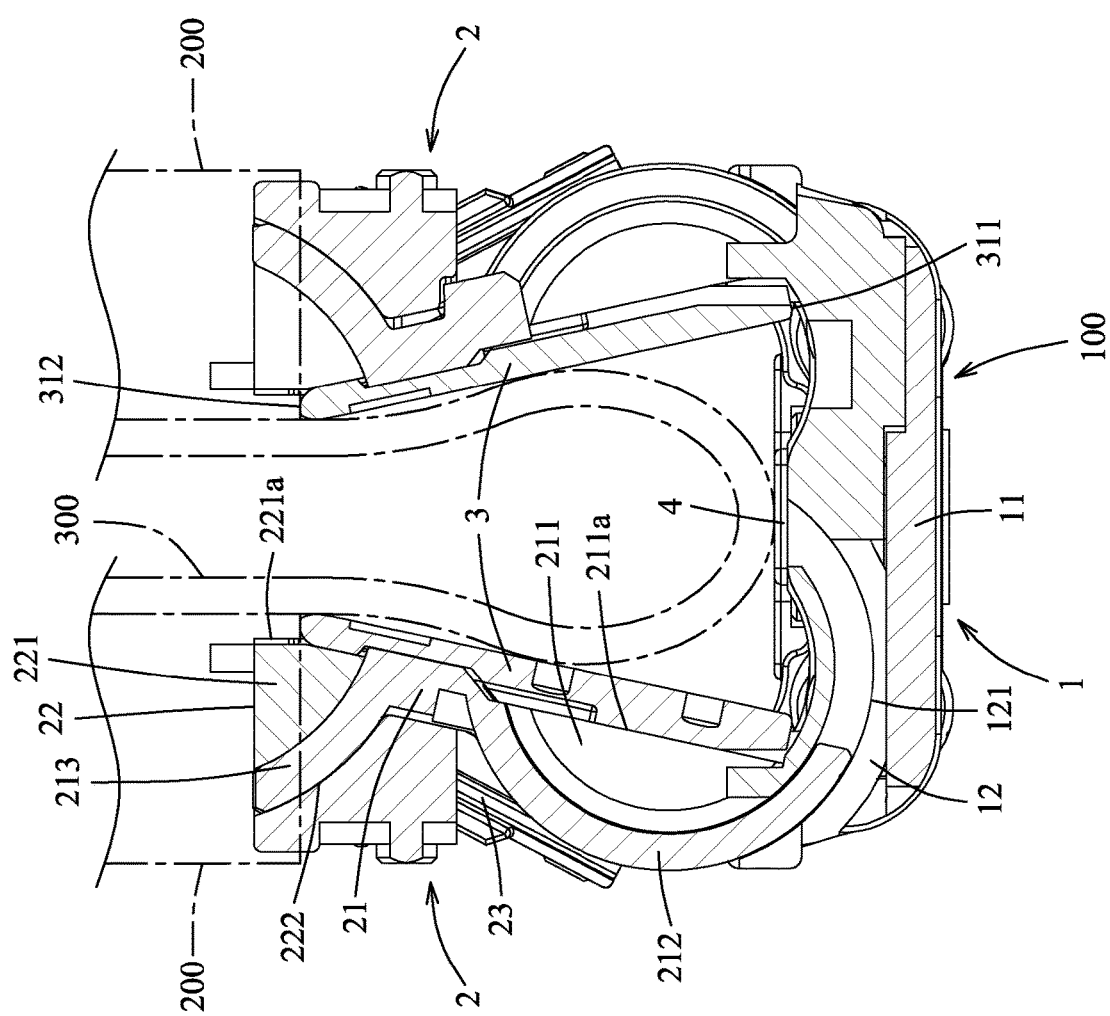
FIG. 9 is a sectional view taken along line IX-IX of FIG. 8.
Figure 10:
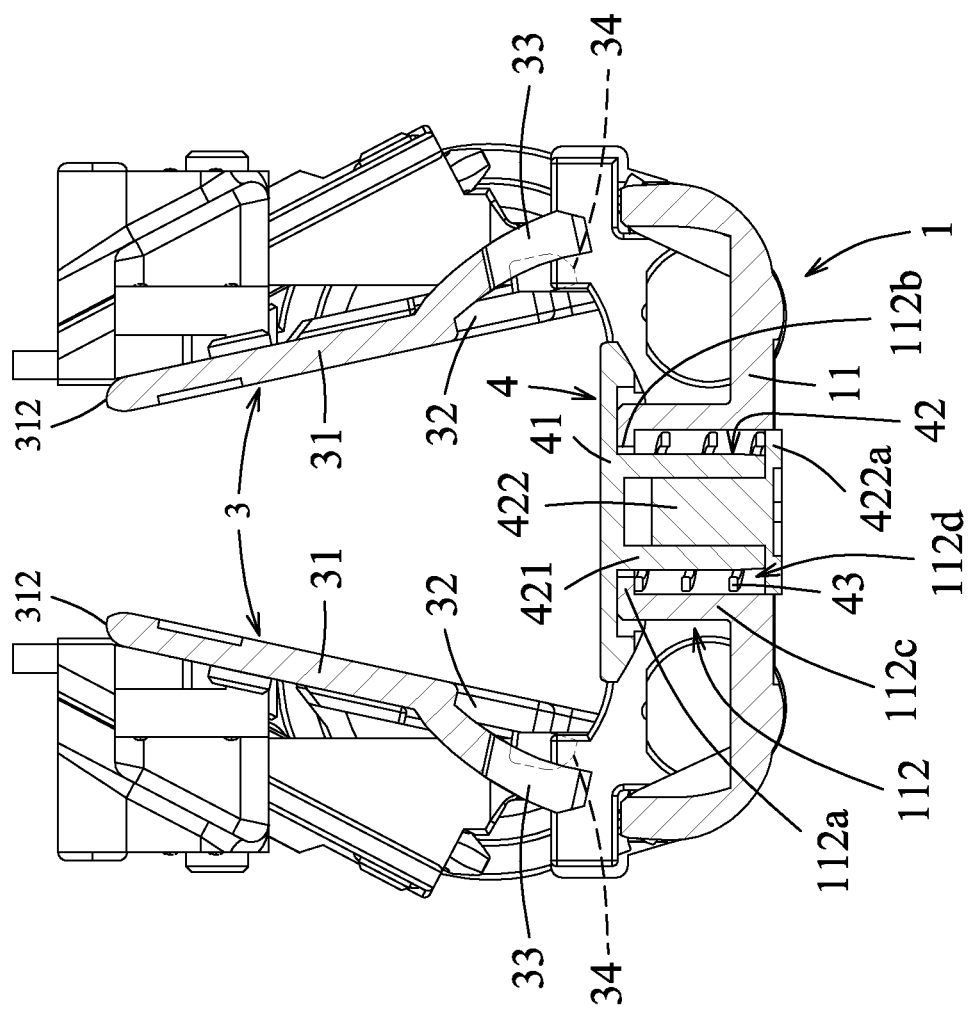
FIG. 10 is a sectional view taken along line X-X of FIG. 8.

With reference to FIGS. 8, 9 and 10, in the closed state, the lateral support plates 3 are brought into an upright position and face each other in the left-right direction. Also, a distance between the inboard plate edges 311 of the lateral support plates 3 is larger than a distance between the outboard plate edges 312 of the lateral support plates 3, and the center support plate 4 is disposed in an abutting position, where the center support plate 4 abuts against the fixed seat 1. With the central notches 32 of the lateral support plates 3, which provides a leeway space for the flexible circuit board (not shown) and other associated electronic elements (not shown), disposed between the housing shells 200, pulling and damage to the flexible circuit board and other elements are prevented. Also, in the closed state, the lateral support plates 3 are moved with the linking members 21, and the support walls 31 of the lateral support plates 3 are respectively parallel to the plate supporting surfaces (211a) of the linking members 21.

Specifically, during the shifting of the linking members 21 from the open state to the closed state, the first arcuate keys 212 are slided along the corresponding first guideways 121. In the closed state, as shown in FIG. 9, the plate supporting surfaces (211a) of the linking members 21 are inclined relative to the up-down direction to be closer to each other at distal sides from the fixed seat 1 such that the distances between the plate supporting surfaces (211a) are gradually increased from the distal sides to the proximal sides. Hence, the distance between the inboard plate edges 311 of the lateral support plates 3 is larger than the distance between the outboard plate edges 312 of the lateral support plates 3. Moreover, the center support plate 4 from which the raising projections 33 and the bracing projections 34 are removed in this state, is biased by the spring members 43 to be moved downwardly to the abutting position. A leeway space is provided among the center support plate 4 and the lateral support plates 3 for accommodating the bending portion of the flexible display 300. It is noted that, during the shifting from the closed state to the open state, the center support plate 4 is raised by the raising projections 33 (see FIG. 5) of the lateral support plates 3 from the abutting position, and is supported by the raising projections 33 and the bracing projections 34 (see FIG. 5) to the filling position so that the center support plate 4 is kept at the filling position. Alternatively, the bracing projections 34 may be dispensed therewith so that the center support plate 4 is raised and supported by the raising projections 33.

With reference to FIGS. 3, 8, 9 and 10, during the shifting of each rotating unit 2 from the open state to the closed state, the sliding member 22 is slided relative to the second arcuate key 213 and the inclined guiding portion 232, and is rotated relative to the fixed seat 1. With the sliding member 22 slidable arcuately and inclinedly, the shell supporting surfaces (221a) of the sliding members 22 are brought to be parallel to each other and opposite to each other in the left-right direction in the closed state so as to superimpose the housing shells 200 to each other in parallel.

Figure 2:
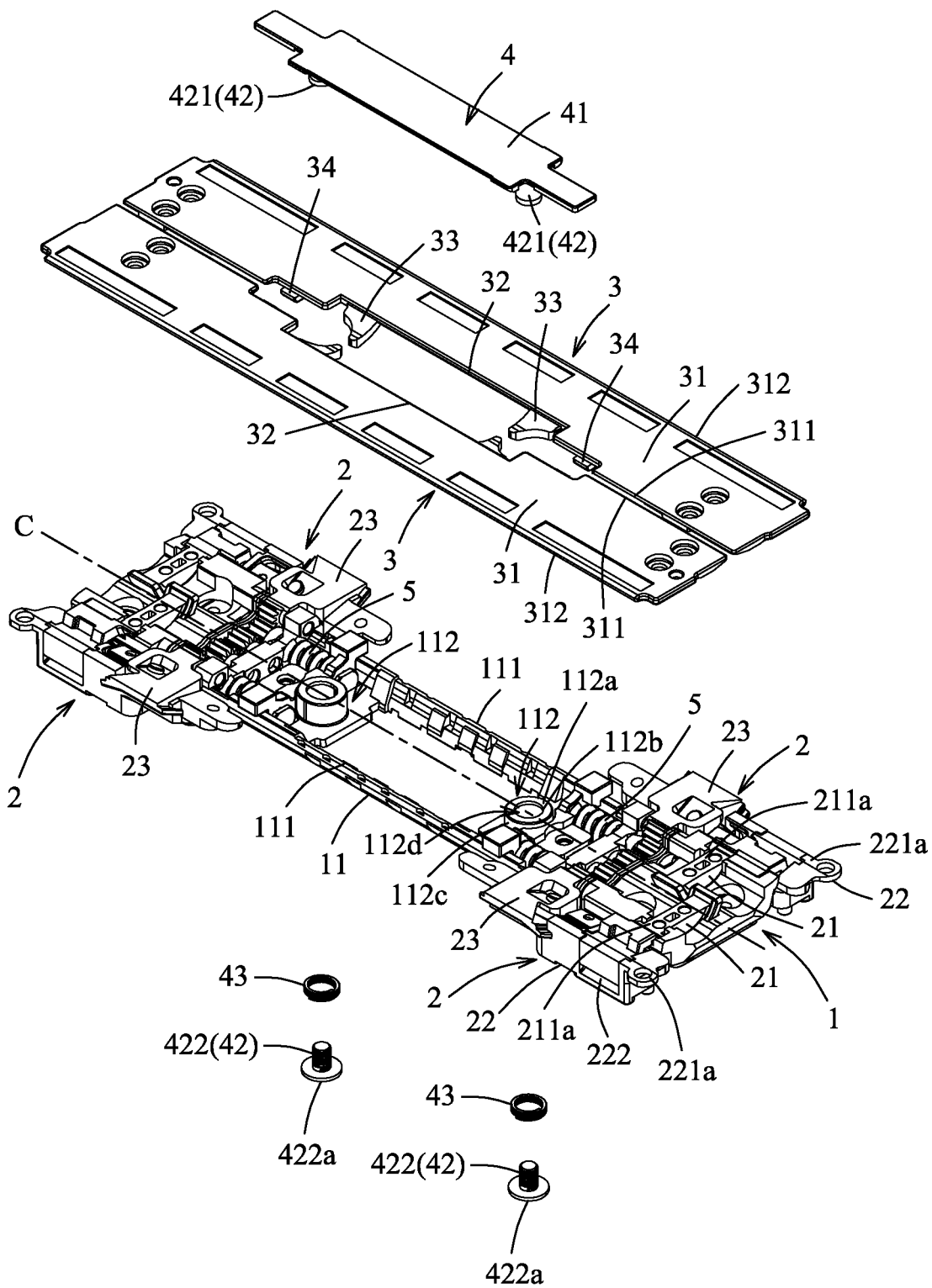
FIG. 2 is an exploded perspective view of the embodiment.
Figure 3:
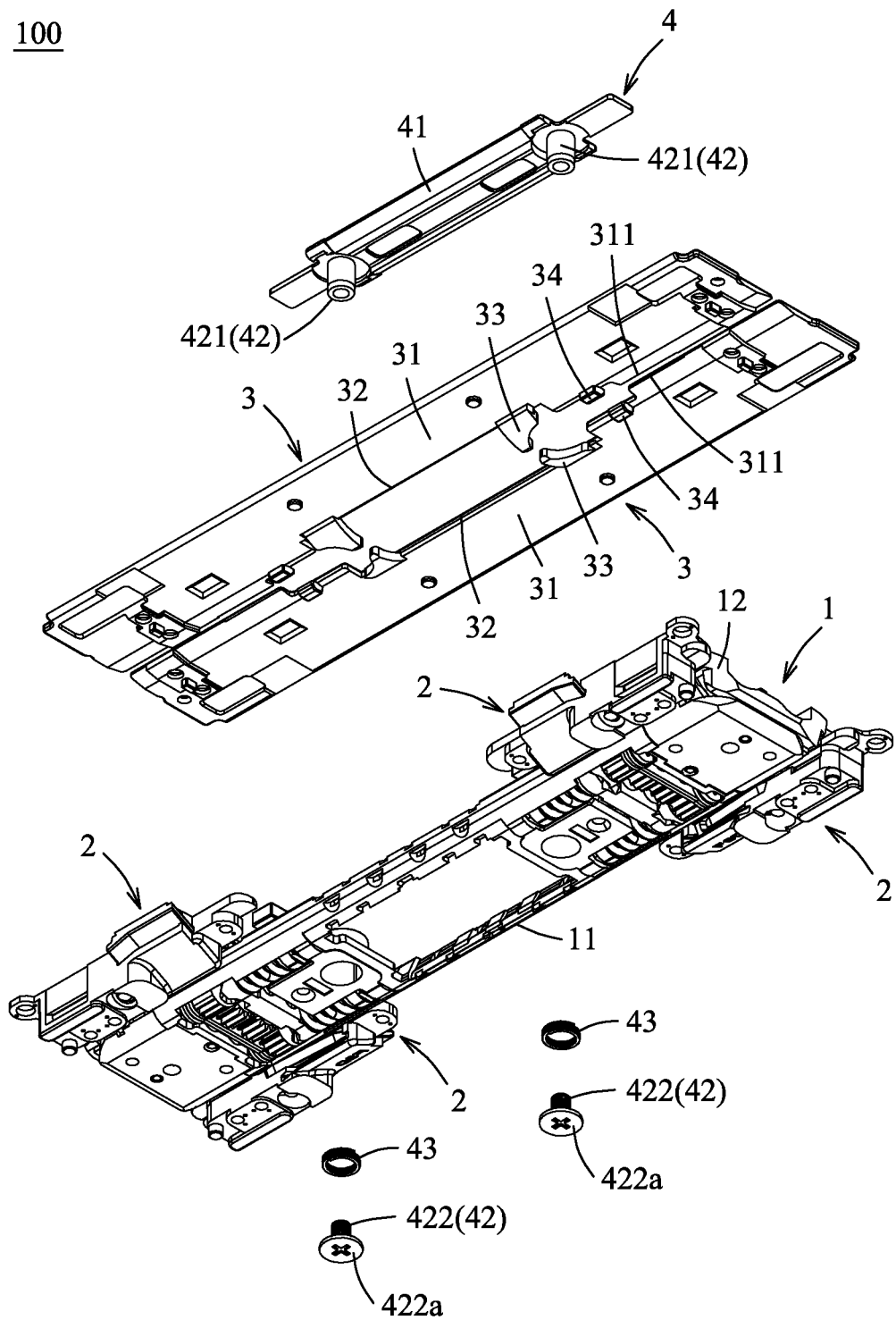
FIG. 3 is an exploded perspective view of the embodiment taken from another angle.
Figure 4:
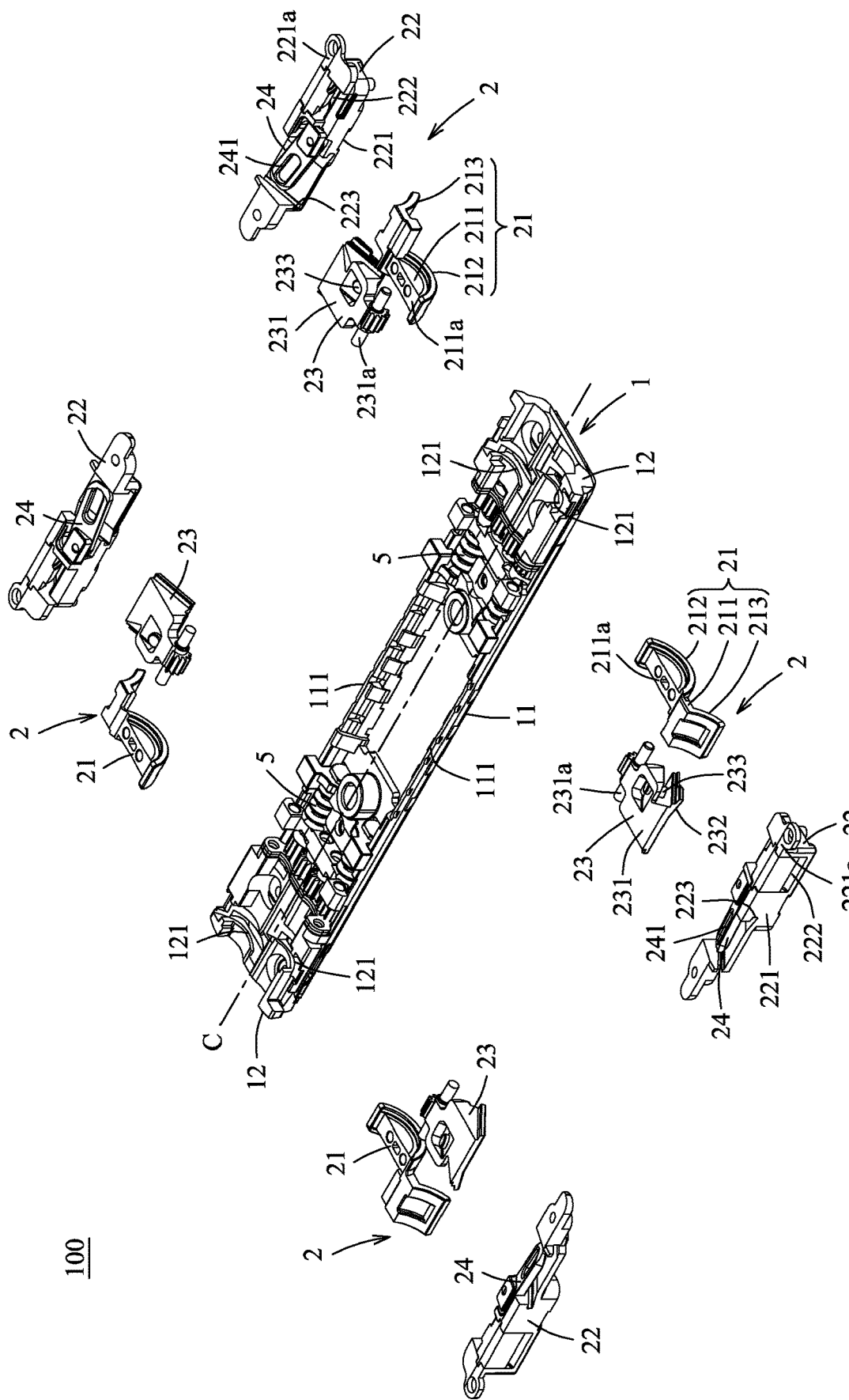
FIG. 4 is an exploded perspective view of a portion of the embodiment.

With reference to FIGS. 2 and 3, in this embodiment, the torque transmission and synchronous driving mechanisms 5 are disposed on the fixed frame 11 of the fixed seat 1, and each are connected with the rotary brackets 23 to make synchronous rotation of the rotating units 2 in opposite rotational directions, and to provide a frictional torque to retain the rotating units 2 at any desired angular position.

As illustrated, with the central notches 32 of the lateral support plates 3 which provides some leeway space for the flexible circuit board and other associated electronic elements disposed between the housing shells 200, pulling and damage to the flexible circuit board and other elements can be prevented. Also, in the open state, the center support plate 4 is disposed in the central notches 32 of the lateral support plates 3 in the filling position, to permit the lateral support plates 3 and the center support plate 4 to cooperatively support the flexible display 300. In the closed state, the center support plate 4 is moved to abut against the fixed seat 1 in the abutting position so as to increase the space for accommodating the bending portion of the flexible display 300.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge connectable with two housing shells for permitting relative opening and closing of the housing shells, comprising:
a fixed seat extending in a front-rear direction and having two elongated sides which extend in the front-rear direction and which are opposite to each other in a left-right direction, and at least two first guideways which are disposed at two sides of a centerline between said two elongated sides, respectively, and which are arcuate;
at least two rotating units disposed at said two sides of said centerline and adjacent to said first guideways, respectively, and connectable with the housing shells, respectively, said rotating units being shiftable between an open state and a closed state, each of said rotating units including a linking member, said linking member having a linking body and a first arcuate key which is disposed on said linking body to be fittingly slidable on a respective one of said first guideways, said linking body having a plate supporting surface which faces upwardly;
two lateral support plates respectively having two inboard plate edges each extending in the front-rear direction, and two support walls extending in the left-right direction from a respective one of said inboard plate edges to terminate at two outboard plate edges, respectively, said support walls being respectively mounted on said plate supporting surfaces of said linking members of said rotating units to be moved with said linking members, each of said lateral support plates having a central notch which is recessed from one of said inboard plate edges in the left-right direction; and
a center support plate movably disposed on said fixed seat and moved with said rotating units,
wherein, in the open state, said inboard plate edges of said lateral support plates are juxtaposed and adjacent to each other, and said center support plate is in a filling position, where said center support plate is disposed in said central notches of said lateral support plates, to permit said lateral support plates and said center support plate to cooperatively conceal said fixed seat in an up-down direction, and, in the closed state, said lateral support plates face each other in the left-right direction, a distance between said inboard plate edges of said lateral support plates is larger than a distance between said outboard plate edges of said lateral support plates, and said center support plate is disposed in an abutting position, where said center support plate abuts against said fixed seat.

2. The hinge of claim 1, wherein said fixed seat has two guiding sockets opposite to each other along the centerline, said center support plate having a plate wall, two guided plugs which extend downwardly from said plate wall to be slidably engaged with said guiding sockets, respectively, and two spring members which are sleeved around said guided plugs, respectively, each of said guided plugs having a head portion which is spaced apart from said plate wall, each of said spring members being disposed between said head portion and a respective one of said guiding sockets to bias said center support plate toward the abutting position.

3. The hinge of claim 2, wherein each of said lateral support plates has a plurality of raising projections each projecting from a respective one of said inboard plate edges into said central notch such that said center support plate is raised by said raising projections from the abutting position to the filling position during shifting of said rotating units from the closed state to the open state.

4. The hinge of claim 3, wherein each of said lateral support plates further has a plurality of bracing projections each projecting from a respective one of said inboard plate edges into said central notch such that, in the open state, said center support plate is supported by said raising projections and said bracing projections to the filling position.

5. The hinge of claim 2, wherein each of said guiding sockets has a surrounding wall extending upwardly to terminate at an upper end wall which extends radially to define a narrow hole for permitting passage of a respective one of said guided plugs, said head portion of each of said guided plugs being slidably disposed within said surrounding wall and opposite to said upper end wall, each of said spring members being disposed between said head portion and said upper end wall so as to bias said head portion away from said upper end wall.

6. The hinge of claim 2, wherein each of said guided plugs includes a plug which extends downwardly from and is integrally formed with said plate wall, and a fastener which is connected with said plug and which is formed with said head portion at an end thereof.

7. The hinge of claim 2, wherein said fixed seat includes a fixed frame which has said two elongated sides and said guiding sockets, and a rail frame which is securely mounted on said fixed frame and which is formed with said two first guideways.

8. The hinge of claim 1, wherein said linking member has a second arcuate key which is disposed on said linking body and which extends in the left-right direction away from said fixed seat, each of said rotating units further including a sliding member and a rotary bracket, said sliding member having a sliding body, a second guideway which is disposed on said sliding body and which is arcuate for said second arcuate key to be fittingly slidable on said second guideway, and an inclined sliding portion which is disposed on said sliding body opposite to said second guideway in the front-rear direction, said sliding body having a shell supporting surface which faces upwardly and on which a respective one of the housing shells is disposed, said rotary bracket being pivotably mounted on said fixed seat, and having a bracket body and an inclined guiding portion which is disposed on said bracket body and which is fittingly movable on said inclined sliding portion, wherein, during shifting of said rotating units from the open state to the closed state, said sliding member is slided relative to said second arcuate key and said inclined guiding portion and is rotated relative to said fixed seat.

9. The hinge of claim 8, wherein, in the open state, said shell supporting surfaces of said sliding members are parallel to said plate supporting surfaces of said linking members, and, in the closed state, said shell supporting surfaces of said sliding members are disposed parallel to each other and opposite to each other in the left-right direction.

* * * * *